Patented Feb. 3, 1925.

1,524,791

UNITED STATES PATENT OFFICE.

WALTER KÖNIG, OF DRESDEN, GERMANY, ASSIGNOR TO FARBENFABRIKEN VORM. FRIEDR. BAYER AND CO., OF LEVERKUSEN, NEAR COLOGNE ON THE RHINE, GERMANY.

BASIC DYE.

No Drawing.    Application filed May 5, 1923. Serial No. 637,014.

*To all whom it may concern:*

Be it known that I, WALTER KÖNIG, a citizen of Germany, residing at Dresden A., in the State of Saxonia, Germany, have invented new and useful Improvements in Basic Dyes, of which the following is a specification.

I have found that new and valuable basic dyestuffs can be obtained by condensing orthoformic ester e. g. $HC(OC_2H_5)_3$ with cyclammonium salts containing reactive methyl groups standing in alpha-position to the nitrogen e. g. the alpha-methylindoleninium salts.

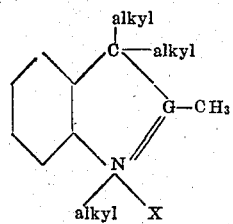

the μ-methylbenzoxazolium- and thiazolium salts

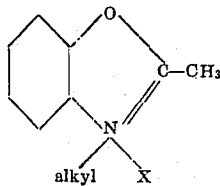 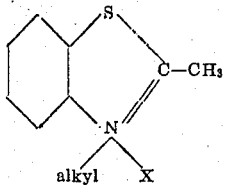

X stands for Cl, Br, I, $SO_4H$, $ClO_4$, etc.

My new dyestuffs are after being dried and pulverized generally dark crystalline powders soluble in water generally with a reddish yellow to bluish coloration. They have most probably the following general formula:

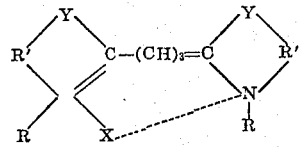

R stands for alkyl or aryl: R' for vinylene or phenylene etc. Y stands for

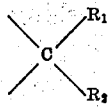

or —S— or —O—: X stands for Cl, Br, I, $SO_4H$, $ClO_4$ etc.

They dye tannin mordanted cotton very pure from yellow to red to violet to blue shades fast to light and washing.

In order to illustrate my invention more fully the following example is given:—5 grams of the methyl-iodide of alpha-beta-beta-trimethylindolenine are dissolved in 100 cubic centimeters of hot acetic acid anhydride. 3 grams of ortho-formic-ethyl-ester are added to this solution which is kept boiling in a vessel provided with a reflux condenser in such a way that the acetic ester and the methyl-iodide split off can go over. After half an hour the production of the dye is complete. After having distilled off the greater part of the acetic acid anhydride the residue is dissolved in boiling water. The new dye separates in the shape of steel grey glittering crystals. It is soluble in hot water and easily soluble in alcohol with a greenish-yellow fluorescence. It dyes wool tannin mordanted cotton and collodion silk red shades. It has most probably the formula:

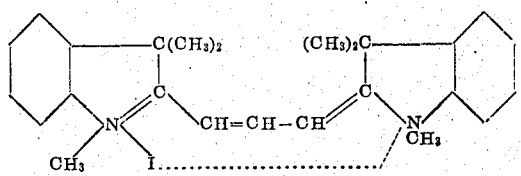

By replacing in the above example the orthoformic ester by the equivalent quantity of beta-ethoxy-acrolein-acetal or propargyl-acetal a blue dye results having most probably the following formula

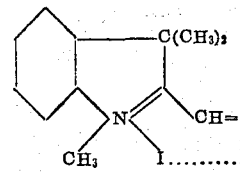 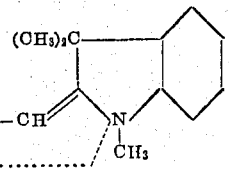

The iodomethylate of the n-methylbenzothiazol gives with ortho-formic-ester a violet product. The oxazole derivative is a yellow dye.

I claim:—

1. The herein described new basic coloring matters obtainable by condensing cyclammonium salts containing in alpha-position to the nitrogen a methyl group with ortho-formic ester, which dyes are, after being dried and pulverized, generally crystalline powders soluble in water generally with a yellowish to reddish to bluish coloration and dyeing tannin mordanted cotton from yellow to red to violet to blue shades fast to light and washing, substantially as described.

2. The herein described basic dye having most probably the following formula:

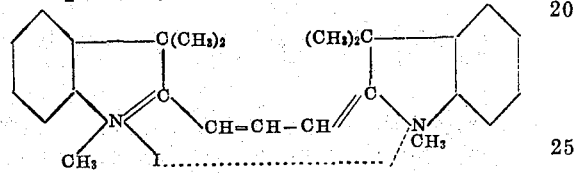

forming steel grey glittering crystals soluble in hot water and in alcohol with a red coloration showing a greenish-yellow fluorescence; dyeing tannin mordanted cotton red shades, substantially as described.

In testimony whereof I have hereunto set my hand.

WALTER KÖNIG.